_United States Patent Office_

3,576,032
Patented Apr. 20, 1971

3,576,032
ORGANOSILICON COMPOUNDS
Christopher A. Pearce, Cowbridge, Glamorgan, Wales, assignor to Midland Silicones Limited, Reading, England
No Drawing. Filed May 21, 1969, Ser. No. 826,732
Claims priority, application Great Britain, May 29, 1968, 25,832/68
Int. Cl. C07f 7/06, 7/18
U.S. Cl. 260—448.2
8 Claims

ABSTRACT OF THE DISCLOSURE

Compounds of the general formula $HR_2SiC_6H_4OM$ where R is a monovalent hydrocarbon radical and M is H or $-SiR'_2H$ where R' is a monovalent hydrocarbon radical as exemplified by $H(CH_3)_2SiC_6H_4OH$ and $H(CH_3)_2SiC_6H_4OSiH(CH_3)_2$ and useful in polymerization reactions.

---

This invention relates to organosilicon compounds containing a diorganosilyl group attached to a benzene nucleus and to a process for their preparation.

According to the invention there are provided compounds of the general formula

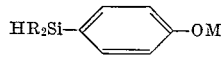

wherein each R is a monovalent hydrocarbon radical and M is a hydrogen atom or the radical $-SiR'_2H$ in which each R' is a monovalent hydrocarbon radical.

In the general formula R and R' can be the same or different and represent monovalent hydrocarbon radicals, for example, the methyl, ethyl, propyl, octadecyl, vinyl, allyl and phenyl radicals. However, in view of the ready availability of the methyl and phenyl silane starting materials, the preferred compounds are those in which R and R' are selected from methyl and phenyl radicals.

The compounds of this invention in which M in the general formula represents the $-SiR'_2H$ radical are obtained by means of a Wurtz-Fittig reaction in which a compound of the general formula $HR_2SiY$ is reacted with a compound of the general formula

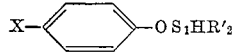

X and Y in the general formulae each representing a chlorine atom or a bromine atom, under conditions which effect the elimination of the silicon-bonded halogen atoms as an alkali metal chloride. This invention therefore includes a process for the preparation of an organosilicon compound of the general formula

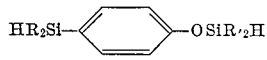

which comprises reacting together (1) a compound of the general formula $R_2HSiY$ and (2) a compound of the general formula

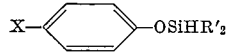

in the presence of (3) an alkali metal, R and R' in the general formulae being as hereinabove defined and X and Y, which can be the same or different, each representing a chlorine atom or a bromine atom.

Preferably, the alkali metal employed in the reaction is sodium, but potassium can be used if desired.

Each R and each R' can have the same or different values in individual compounds and R can be the same as, or different from R'. The silanes which comprise reactant (1) in the process of the invention are, in general, well-known materials and can be exemplified by dimethylchlorosilane, phenylmethylchlorosilane, diphenylbromosilane and vinylmethylbromosilane.

The compounds which are employed as reactant (2) in the process of this invention can be prepared, for example, as described in our copending application, Ser. No. 826,731, filed concurrently herewith. The process comprises reacting a p-halophenol with a compound containing the grouping $R'_2HSi-$, for example, a chlorosilane of the formula $R'_2HSiCl$, an amino silane of the general formula $R'_2SiHNR''_2$ where R'' is a hydrogen atom, an alkyl radical or an aryl radical or a disilazane of the formula $(R'_2SiH)_2NR'''$, R''' being a hydrogen atom or an alkyl radical. When the chlorosilane is employed, the reaction mixture preferably contains a hydrogen halide acceptor, for example, a tertiary amine such as pyridine.

In carrying out the process of this invention, an organic solvent is preferably, although not essentially, included in the reaction mixture as a carrier for the alkali metal and to facilitate recovery of the product. A wide variety of solvents can be used, those preferred being the hydrocarbons such as toluene and xylene. The reaction is sluggish at ambient temperatures and is best carried forward at an elevated temperature, preferably at or above the melting point of the alkali metal (3).

The proportions of the reactants employed is not narrowly critical and can vary from .1 to 10 mols of reactant (1) per mol of reactant (2). We have found that good yields of the desired product can be obtained employing approximately stoichiometric proportions of the reactants.

Compounds of the general formula

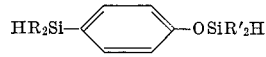

that is, where M represents the $-SiR'_2H$ radical, can be converted by hydrolysis to the corresponding phenolic compounds, that is, in which M represents the hydrogen atom. Although the hydrolysis reaction to obtain the phenolic compound can be carried out by contacting the appropriate compound with water alone, it is preferred to employ as the hydrolysis medium a mixture of water and a water miscible organic solvent, for example, methanol, as this gives a homogeneous solution which accelerates the hydrolysis.

The compounds of this invention in which M in the general formula represents the hydrogen atom are of particular interest as intermediates in the preparation of monomeric and polymeric silicon compounds containing diphenyl carbonate groups. For example, they can be reacted with diorganopolysiloxanes containing terminal silicon-bonded vinyl radicals in the presence of an $\equiv SiH$ to $C=C$ addition catalyst e.g. chloroplatinic acid and the resulting product further reacted with bisphenol A and phosgene to provide block copolymers of diphenyl carbonate units and diorganosiloxane units. The compounds of the invention in which M represents the $-SiR'_2H$ group are also useful as intermediates and can be reacted via the silicon-bonded hydrogen atoms with silicon compounds containing silicon-bonded olefinically unsaturated radicals.

The following examples illustrate the invention which is delineated in the claims and is not limited by the examples.

EXAMPLE 1

Sodium metal (9.6 g., 0.412 g. atom) was placed (under an atmosphere of dry argon) in a flask containing toluene (150 mls.) and heated until the sodium was molten (approximately 110°). To this vigorously stirred hot mixture was slowly added a mixture of p-chloro-O-dimethylsilylphenol (38.8 g., 0.207 mole) and dimethylchlorosilane (19.7 g., 0.208 mole) over a period of 2 hours. After refluxing for an half hour after the addition was complete, the mixture was allowed to cool and the blue-black precipitate removed by filtration. The toluene was removed from the filtrate by distillation and the solvent free residue fractionally distilled at reduced pressure. The p-dimethylsilyl-O-dimethylsilylphenol was obtained as a cut (14.4 g., 33%) B.P. 51°/0.4 mm. $n_D^{25}$ 1.4906. The structure was confirmed by elemental analysis: Found: C, 56.9; H, 8.3; Si, 26.2%. Calc. for $$Me_2HSiC_6H_4OSiHMe_2$$

C, 57.1; H, 8.6; Si, 26.7%, and by infrared spectroscopy.

EXAMPLE 2 p-Dimethylsilyl-O-dimethylsilylphenol (10.7 g. 0.051 mole) (as prepared in Example 1) was dissolved in methanol (20 mls.) and 3 mls. water added. The mixture was allowed to stand overnight and then 75 mls. water added to throw the hydrolyzed phenol out of solution as an upper oily liquid layer. This layer was separated off, washed once with water and poured into an open beaker where it crystallized on standing to colorless needles of p-dimethylsilylphenol 7.2 g. (93%), M.P. 56°.

The structure of the product was confirmed by elemental analysis: Found: C, 63.3; H, 8.2; Si, 18.8%. Calc. for $Me_2HSiS_6H_4OH$: C, 63.2; H, 7.9; Si, 18.4%, and by infrared spectroscopy.

That which is claimed is:

1. Organosilicon compounds of the general formula

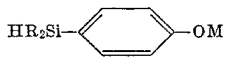

wherein each R is a monovalent hydrocarbon radical and M is a hydrogen atom or the radical —SiR′$_2$H in which each R′ is a monovalent hydrocarbon radical.

2. Organosilicon compounds as claimed in claim 1 wherein R and R′ are methyl or phenyl radicals.

3. The compound of the formula

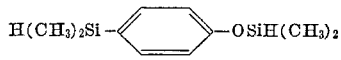

4. The compound of the formula

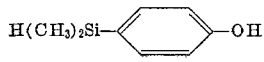

5. A process for the preparation of an organosilicon compound of the general formula

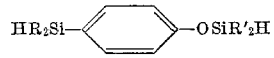

which comprises reacting together (1) a compound of the general formula R$_2$HSiY (2) a compound of the general formula

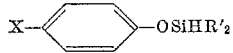

and (3) an alkali metal, in the general formulae R and R′ each representing a monovalent hydrocarbon radical and X and Y each representing a chlorine atom or a bromine atom.

6. A process as claimed in claim 5 wherein the alkali metal (3) is sodium.

7. A process for the preparation of an organosilicon compound of the general formula

wherein each R is a monovalent hydrocarbon radical which comprises hydrolyzing

where R and R′ are monovalent hydrocarbon radicals.

8. A process as claimed in claim 7 wherein the hydrolysis reaction is performed employing as the hydrolysis medium a mixture of water and a water-miscible organic solvent.

References Cited

UNITED STATES PATENTS

| | | | |
|---|---|---|---|
| 2,611,776 | 9/1952 | Speier | 260—448.2B |
| 2,611,779 | 9/1952 | Speier | 260—448.8R |
| 2,611,781 | 9/1952 | Speier | 260—448.8R |
| 2,711,417 | 6/1955 | Frisch | 260—448.2B |
| 3,137,720 | 6/1964 | Cooper | 260—448.2B |
| 3,328,450 | 6/1967 | Plueddemann | 260—448.8R |
| 3,491,137 | 1/1970 | Zaweski et al. | 260—448.8R |

TOBIAS E. LEVOW, Primary Examiner

P. F. SHAVER, Assistant Examiner

U.S. Cl. X.R.

260—826, 448.2H, 448.8R, 448.2E